United States Patent [19]

Curry et al.

[11] Patent Number: 4,992,322
[45] Date of Patent: Feb. 12, 1991

[54] COEXTRUDED PRODUCTS WITH IMPROVED WEATHERABILITY

[75] Inventors: Herbert L. Curry, Mt. Vernon, Ind.; Kirk L. Kimbel, Highland Park, Ill.

[73] Assignee: General Electric Company, Pittsfield, Mass.

[21] Appl. No.: 210,270

[22] Filed: Jun. 23, 1988

[51] Int. Cl.$^5$ .............................................. B32B 27/36
[52] U.S. Cl. .................................... 428/215; 428/412; 264/176.1
[58] Field of Search ................................ 428/215, 412

[56] References Cited

U.S. PATENT DOCUMENTS

| | | |
|---|---|---|
| 4,465,820 | 8/1984 | Miller et al. . |
| 4,513,037 | 4/1985 | Collins ........................... 428/35 |
| 4,556,606 | 12/1985 | Olson . |
| 4,559,388 | 12/1985 | Liu et al. . |
| 4,643,937 | 2/1987 | Dickinson et al. . |
| 4,707,393 | 11/1987 | Vetter . |
| 4,776,913 | 10/1988 | Goossens et al. ............... 428/412 |
| 4,824,723 | 4/1989 | Campbell et al. ............... 428/522 |

FOREIGN PATENT DOCUMENTS

| | | |
|---|---|---|
| 0121883 | 10/1984 | European Pat. Off. . |
| 3244953A1 | 6/1984 | Fed. Rep. of Germany . |
| 2019780 | 11/1979 | United Kingdom . |
| 2048167 | 12/1980 | United Kingdom . |

Primary Examiner—P. C. Sluby
Attorney, Agent, or Firm—Spencer D. Conard; William F. Mufatti

[57] ABSTRACT

A coextruded moisture resistant polycarbonate article has a relative thin moisture resistant, polyphthalate-carbonate layer adhered to a relatively thick aromatic polycarbonate corelayer. The coextruded article has the high degree of transparency of aromatic polycarbonates and the moisture resistance and haze resistance of polyphthalate-carbonate. Coextruded sheet and film of the present invention may be subsequently thermoformed without losses in the desirable properties thereof.

8 Claims, No Drawings

COEXTRUDED PRODUCTS WITH IMPROVED WEATHERABILITY

FIELD OF THE INVENTION

This invention relates to moisture resistant polycarbonate articles. More particularly, it relates to coextruded articles having a polycarbonate resin inner layer and a moisture resistant, copolyphthalate-carbonate resin outer layer for imparting moisture resistance to the article.

BACKGROUND OF THE INVENTION

Aromatic carbonate polymers are well known thermoplastic materials which, due to their many advantageous properties, find use as thermoplastic engineering materials. The aromatic carbonate polymers exhibit, for example, excellent properties of toughness, impact resistance, heat resistance, dimensional stability and high levels of transparency to visible light. Films and sheets may be extruded from aromatic carbonate polymers to yield transparent articles having high optical quality. Unprotected aromatic polycarbonate articles, however, absorb moisture which results in hazing of the articles thereby greatly diminishing their optical qualities and degree of transparency. Prior attempts to reduce moisture absorption have involved the application of coatings to the surface of the articles. Many of these coatings however suffer from being relatively expensive to apply, requiring a processing step in addition to the extrusion operation, and suffer from being subject to embrittlement and loosing their adherence to the aromatic polycarbonate sheet or film during weathering of the article.

SUMMARY OF THE INVENTION

Accordingly, the present invention provides a coextruded, moisture resistant aromatic polycarbonate article having a relatively thin moisture resistance copolyester-carbonate outerlayer and a relatively thick aromatic polycarbonate inner layer. The coextruded copolyester-carbonate/aromatic polycarbonate layers exhibit excellent adhesion, compatibility and weatherability. The coextruded article exhibits high levels of transparency while also exhibiting resistance to moisture absorption and consequent hazing formation therefrom. The present invention also contemplates coextrusion of an ultraviolet radiation absorber rich polycarbonate layer between the copolyester-carbonate layers to thereby provide an article having a thin, moisture resistant copolyester carbonate layer, a thin ultraviolet radiation resistant inner layer, and a relatively thick moisture sensitive, UV radiation sensitive polycarbonate core layer.

DETAILED DESCRIPTION OF THE INVENTION

In accordance with the instant invention there are provided coextruded articles having corelayers of aromatic polycarbonate resin and having outer layers of protective, moisture resistant copolyestercarbonate. The coextruded articles of the present invention exhibit excellent resistance to moisture absorption and hazing resulting therefrom.

The aromatic polycarbonate resins for use in the core layer herein can be prepared by reacting a dihydric phenol with a carbonate precursor, such as phosgene, a haloformate or a carbonate ester. Generally speaking, such carbonate polymers may be typified as possessing recurring structural units of the formula:

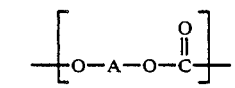

FIG. I wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:
2,2-bis(4-hydroxyphenyl)propane;
hydroquinone;
resorcinol;
2,2-bis-(4-hydroxyphenyl)pentane;
2,4'-dihydroxydiphenylmethane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether; and the like.

Other dihydric phenols which are also suitable for use in the above polycarbonates are disclosed in U.S. Pat. Nos. 2,999,835; 3,028,365; 3,334,154; and 4,131,575.

These aromatic polycarbonates can be manufactured by known processes, such as for example and as mentioned above, by reacting a dihydric phenol with a carbonate precursor, such as phosgene, in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy or acid terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184, also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer is a homopolymer derived from 2,2-bis(4-hydroxyphenyl)propane (bisphenol-A).

The outer, protective, moisture resistant copolyester-carbonate outer layer is preferably the copolyester carbonate set forth in Miller et al., U.S. Pat. No. 4,465,820 which is incorporated herein by reference. The copolyester carbonate layer of the present invention is known as a polyphthalate-carbonate and is derived from a dihydric phenol, a carbonate precursor, a terephthalic acid or acid derivative and an isophthalic acid or acid derivative, the copolyestercarbonate having (1) from about 70 to about 95 weight percent ester content which is preferably from about 2 to 15 weight percent terephthalate and 85 to 98 percent isophthalate, and more preferably from about 5 to 10 weight percent terephthalate and 90 to 95 weight percent isophthalate.

The dihydric phenols which can be employed to prepare the copolyestercarbonates useful in this invention include the dihydric phenols generally found useful in preparing copolyestercarbonates and aromatic polycarbonates. Typical dihydric phenols which can be employed are
2,2-bis(4-hydroxyphenyl)propane (bisphenol A);
2,4'-dihydroxydiphenylmethane;
bis(2-hydroxyphenyl)methane;
bis(4-hydroxyphenyl)methane;
bis(4-hydroxy-5-propylphenyl)methane;
bis(4-hydroxy-2,6-dimethyl-3-methoxyphenyl)methane;
1,1-bis(4-hydroxyphenyl)ethane;
1,1-bis(4-hydroxy-2-ethylphenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.

Bisphenols other than those having a carbon atom between the two phenols can also be employed. Examples of such groups of bisphenols include bis(hydroxyphenyl)sulfides, bis(hydroxyphenyl)ethers and bis(hydroxyphenyl) sulfoxides and the like.

The preferred family of dihydric phenols is illustrated below

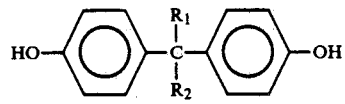

wherein $R_1$ and $R_2$ are the same or different and are hydrogen or alkyl of one to six carbon atoms, inclusive. The most preferred dihydric phenol is bisphenol A.

The aromatic dicarboxylic acids employed in the preparation of the copolyestercarbonate of the invention are terephthalic acid and isophthalic acid and reactive derivatives thereof. Any derivative of a carboxylic acid which is reactive with the hydroxyl of a dihydric phenol can be employed. The acid halides are generally employed because of their ease of reactivity and availability. The acid chlorides are preferred.

The phosgene precursor is the standard precursor employed for preparing aromatic polycarbonate or copolyester-carbonate. Generally, any of the carbonyl halides can be employed as set forth in, U.S. Pat. No. 4,238,596 which is herein incorporated by reference.

The weight percent ester content in the copolyester-carbonate is from about 70 to about 95, preferably about 75 to 90. Above about 95 weight percent ester content the copolyester carbonate is generally more difficult to process. Below about 70 weight percent ester content the copolyester-carbonate DTUL is generally less than desirable. Weight percent ester content is calculated in the following manner wherein the dihydric phenol is bisphenol A.

$$\text{Wt. \% ester} = \frac{(\text{mole \% ester}) (358)}{(\text{mole \% ester}) (358) + (\text{mole \% carbonate}) (254)} \times 100$$

$$\text{Mole \% ester} = \frac{\text{moles of aromatic diacid}}{\text{moles of dihydric phenol}} \times 100$$

358 = molecular weight of

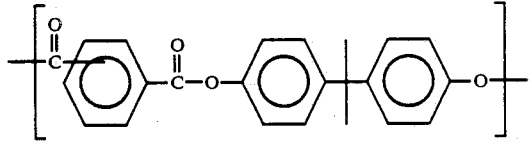

254 = molecular weight of

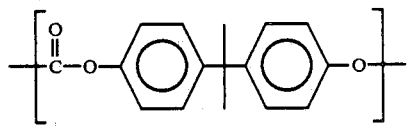

The quantity of terephthalate units present in the copolyester-carbonate is important in achieving the consistently high Notched Izod 3.2 mm impact resistance simultaneously with the high level of stress cracking resistance.

Below about two (2) percent of the ester content being terephthalate, (2% terephthalate, 98% isophthalate), the copolyester-carbonate generally does not provide as consistently high Notched Izod impact resistance in the 3.2 mm thickness from preparation to preparation. Additionally, there is a tendency for the product copolyester-carbonate to display crystallinity in the usual organic solvent employed for soluabilizing the product, for example methylene chloride. When crystallization does occur, the copolyester-carbonate is not completely soluble in the organic solvent which once was capable of solubilizing the material. It is preferable to use better than about 5 percent terephthalate.

The preferred copolyester-carbonate has a water absorption of at most about .19 percent by weight when submerged in water for a 24 hour period at 23° C.

Above about fifteen (15) weight percent terephthalate, the copolyester-carbonate stress cracking resistance appears to diminish. A preferred maximum is less than about ten (10) percent terephthalate.

The coextruded article is formed by coextrusion of the copolyphthalate-carbonate and polycarbonate. The method of coextrusion is a method common to those skilled in the art. The thickness of the copolyphthalate-carbonate is preferably from 1 to 10 mils and the thickness of the polycarbonate core is preferably from 10 to 500 mils. Preferably the article has a core layer of polycarbonate located between two outer copolyphthalate-carbonate layers, such that the coextruded article has the following order and thickness of layers: PPC 1 to 10 mils thick/ PC 10 to 500 mils thick/ PPC 1 to 10 mils thick.

Preferably the coextruded article also comprises inner layers of ultraviolet radiation absorber rich polycarbonate. Preferred absorber layers have from about 3 to 30 percent by weight of an ultraviolet absorber based on the total weight of the absorber layer; more preferably from about 5 to about 15 percent by weight thereof; and most preferably about 10 percent by weight thereof. Preferably the absorber layer is located between the outer PPC layers and the PC corelayer, such that the coextruded article has the following order and thickness of layers: PPC layer at 1 to 10 mils thick/ UV radiation absorber layer at 1 to 10 mils thick/ PC layer at 10 to 500 mils thick/UV radiation absorber layer at 1 to 10 mils thick/PPC layer at 1 to 10 mils thick. The resultant coextruded article obtained having the UV radiation absorber layer therein has excellent resistance to both hazing from moisture absorption and yellowing from ultraviolet radiation. Additionally, due to the outer layer of the extruded article being substantially free of volatile UV radiation absorbers, the article can contain effective levels of UV radiation absorbers without encountering the problem of the absorber plating out onto the surface of extruder finishing rolls and extruder dye lips. The problem of absorber plateout is experienced by many extrusion processes for making single layer articles having screeners incorporated in the resin thereof resulting in finished articles having inferior surface characteristics and optical quality due to the imperfect roller surfaces and dye lips resulting from plateout.

Suitable ultraviolet radiation absorbers which fall into the categories of benzophenone derivatives and benzotriazoles derrivatives are those compounds disclosed in U.S. Pat. Nos. 4,556,606; 3,309,220; 3,049,443; 3,043,709; 3,214,436; and 2,976,259 and U.S. Pat. No. Re. 2,976 all of which are incorporated herein by reference. These absorbers may be blended into the polycarbonate resin prior to extrusion of the UV absorbers rich inner layer.

Methyl methacrylic UV protective outer coatings may be applied to the coextruded articles of the present invention to provide protection thereto from ultraviolet radiation. Suitable coatings are set forth in Curry, U.S. Pat. No. 4,666,779.

We claim:

1. A coextruded article consisting essentially of:
   (a) an aromatic polycarbonate core layer consisting of a polycarbonate resin derived from 2,2-bis(4-hydroxyphenyl)propane and a carbonate precursor; and
   (b) a moisture resistant, polyphthalate-carbonate layer adhered to said core layer.

2. The article of claim 1 wherein said core layer has a thickness of from 10 to 500 mils, and said polyphthalate-carbonate layer has a thickness of from 1 to 10 mils.

3. The article of claim 2 wherein said polyphthalate-carbonate layer comprises a polyphthalate-carbonate resin prepared from a dihydric phenol, a carbonate precursor, a terephthalic acid or ester forming derivatives thereof, an isophthalic acid or ester forming derivatives thereof, said copolyphthalate-carbonate resin having from about 70 to about 95 weight percent ester content, said ester content being from about 2 to about 15 weight percent terephthalate and from about 85 to 98 percent isophthalate.

4. A coextruded article consisting essentially of:
   (a) an aromatic polycarbonate core layer consisting of a polycarbonate resin derived from 2,2-bis(4-hydroxyphenyl)propane and a carbonate precursor; and
   (b) two moisture resistant polyphthalate-carbonate layers adhered to said core layer, said core layer being located between said polyphthalate-carbonate layers.

5. The coextruded articles of claim 4 wherein said core layer has a thickness of from 10 to 50 mils, said polyphthalate-carbonate layers each having a thickness of from about 1 to 10 mils.

6. The articles of claim 5 wherein said polyphthalate-carbonate layers comprises a polyphthalate-carbonate resin prepared from a dihydric phenol, a carbonate precursor, a terphthalic acid or ester forming derivatives thereof, an isophthalic acid or ester forming derivatives thereof, said copolyphthalate-carbonate resin having from about 70 to about 95 weight percent ester content, said ester content being from about 2 to about 15 weight percent terephthalate and from about 85 to 98 percent isophthalate.

7. The article of claim 1 wherein the carbonate precursor is phosgene.

8. The article of claim 4 wherein the carbonate precursor is phosgene.

* * * * *